United States Patent [19]

Strickland et al.

[11] Patent Number: 5,355,477
[45] Date of Patent: Oct. 11, 1994

[54] METHOD FOR UPDATING A BLOCK USING RECORD-LEVEL LOCKS BY COMMITTING THE UPDATE IF THE BLOCK HAS NOT BEEN UPDATED BY ANOTHER PROCESS OTHERWISE SPINNING

[75] Inventors: Jimmy P. Strickland, Saratoga; Kenneth M. Kapulka, San Jose, both of Calif.

[73] Assignee: International Business Machines Corporation, Armonk, N.Y.

[21] Appl. No.: 812,677

[22] Filed: Dec. 23, 1991

[51] Int. Cl.$^5$ ............................................. G06F 12/08
[52] U.S. Cl. ................................... 395/600; 395/650; 395/425; 364/246.8; 364/242.91; 364/269; 364/DIG. 1; 364/282.1
[58] Field of Search ................. 395/600, 425, 400, 650

[56] References Cited

U.S. PATENT DOCUMENTS

| | | | |
|---|---|---|---|
| 4,604,694 | 8/1986 | Hough | 394/650 |
| 4,716,528 | 12/1987 | Crus et al. | 364/300 |
| 4,775,955 | 10/1988 | Liu | 395/425 |
| 4,853,843 | 8/1989 | Ecklund | 395/600 |
| 4,961,134 | 10/1990 | Crus et al. | 395/600 |
| 5,043,876 | 8/1991 | Terry | 364/200 |
| 5,060,144 | 10/1991 | Sipple et al. | 395/600 |
| 5,151,988 | 9/1992 | Yamagishi | 395/600 |
| 5,155,824 | 10/1992 | Edenfield et al. | 395/425 |
| 5,163,148 | 11/1992 | Walls | 395/600 |
| 5,210,848 | 5/1993 | Liu | 395/425 |

OTHER PUBLICATIONS

MVS/EsA VSAM Administration Guide SC 26-4518, International Business Machines, Inc., Armonk, N.Y. (Version 3 Release 1, Jul. 1991).

*Primary Examiner*—Thomas C. Lee
*Assistant Examiner*—Larry J. Ellcessor
*Attorney, Agent, or Firm*—Baker, Maxham, Jester & Meador

[57] ABSTRACT

A Virtual Storage Access Management (VSAM) technique for maintaining data integrity of the record-level shared data in a multiprocessor system environment without the concurrency loss associated with locking at the data Control Interval (CI) or block level. Two or more concurrent processes can update different records within the same VSAM data CI using only a record-level lock. This feature relies upon multiple private data CI copies, Shared External Storage (SES), cache cross-invalidation, and a conditional writing operation. A first process updates a private copy of a data CI containing the target record from SES, logs the changes, and writes the changed data CI back to the SES conditioned upon no update having been made to the same block data CI by a second process in the interim. If a second process has indeed updated the same data CI in the interim, the first process recycles by obtaining the most recent data CI copy from SES, combining it with the first process update log entries and attempting to again conditionally write the modified data CI to SES. This process of logging updates and spinning on an intervening update by another process preserves serialization by record-level locking alone.

9 Claims, 7 Drawing Sheets

Record Merged Copy of CI

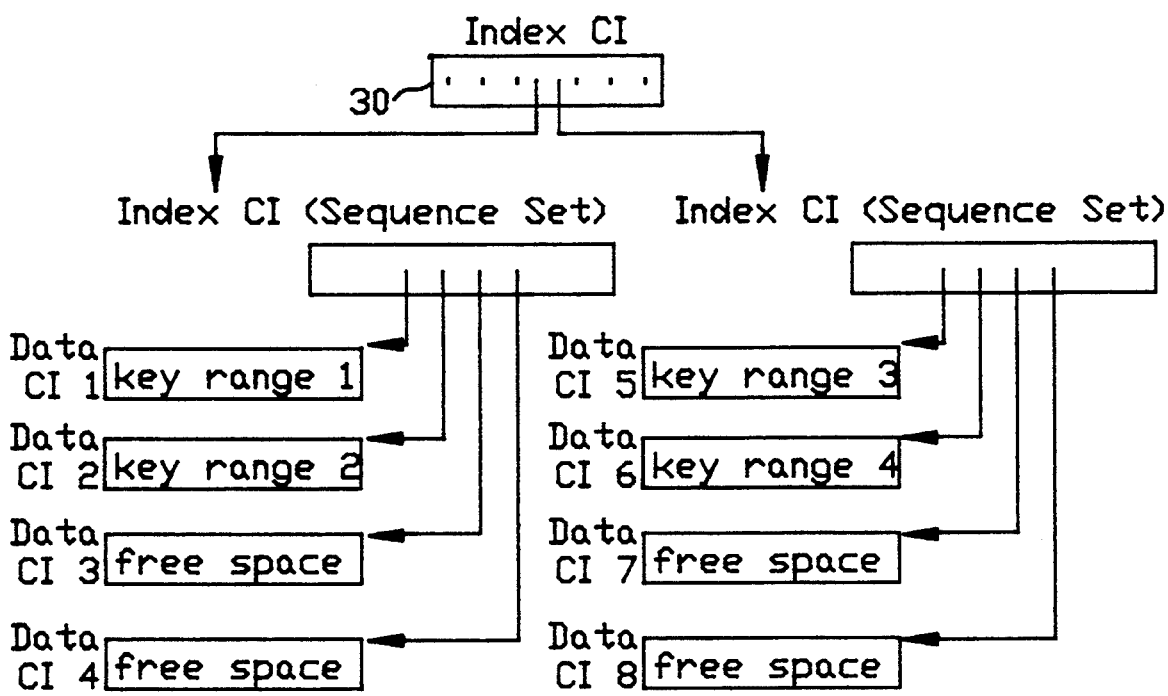

```
Record 1
Record 2
Record 3 (changed)
Record 7
Record 9
Record 10
Record 15 (changed)
Record 22

(CI 1)
```
UOW1's old copy of CI 1

```
Record 9
Record 10
Record 15 (changed)
Record 22

(CI 8)
```
UOW1's copy of CI 8

*FIGURE 7D*

METHOD FOR UPDATING A BLOCK USING RECORD-LEVEL LOCKS BY COMMITTING THE UPDATE IF THE BLOCK HAS NOT BEEN UPDATED BY ANOTHER PROCESS OTHERWISE SPINNING

BACKGROUND OF THE INVENTION

1. Field of the Invention

This invention relates to database integrity management procedures for multiple concurrent transaction processing systems, and more particularly, to a method for concurrent record updating within a single data Control Interval or block without lock contention at the block level.

2. Discussion of the Related Art

The lock manager portion of an operating system in a multiprocessing environment assigns and reassigns locks on storage resources on behalf of processes. This locking activity ensures proper transaction serialization and database integrity, but may lead to a decrease in process concurrency. Data processing throughput can fall when the lock manager frequently locks a resource having a high concurrency requirement arising from many concurrent processes operating with the same resource. This lock contention situation requires the lock manager to allocate such a resource among the concurrent processes. Moreover, many of the processes are slowed by the wait states imposed to sort out the lock contention. The lock manager must also consume processing time to lock, unlock and resolve wait and resume conditions.

Because a relational database management system operates with concurrent processes in a multiprocessor database environment, it uses facilities such as lock managers. The present state of the art can be appreciated by reference to C. J. Date, "A Guide to DB2", Addison-Wesley Publishing Co., pp. 191–195 (1984); and C. J. Date, "An Introduction to Database Systems", Addison-Wesley Publishing Co., pp. 422–427 (1986). Refer also to H. F. Korth, et al, "Database System Concepts" McGraw Hill, Inc., pp. 356–402 (1986), for a general discussion of concurrency control in database systems.

In multiprocessing systems generally, and database management systems in particular, when one user accesses a file for editing or updating purposes, all other users are locked out until the accessing update is completed or committed. To improve concurrency in a shared file environment, multiple users should be permitted to read a file that is being concurrently updated. Also, one user should be permitted to update records in the same file in which another user is updating different records.

Practitioners in the art have suggested many methods for improving concurrency in database systems. In U.S. Pat. No. 4,716,528, Richard A. Crus, et al disclose a method that typifies such hierarchical locking and lock promotion techniques with the variable granularity that can manage the trade-off between lock processing overhead and concurrency. Crus, et al teach the use of a coordinated pair of locking limits where a first limit is placed on the number of "small granularity" locks per resource and a second limit is placed on the total number of locks assignable to each process. When the "small" lock limit is breached, their method withdraws all small locks and grants a single global lock to the entire resource (lock escalation), thereby reducing the total number of locks. When the process requests an additional lock over the total lock number limit, the lock is refused. However, Crus, et al do not suggest a technique of constant granularity (and, thus, low overhead) for avoiding lock contention at the block level during concurrent block access.

In U.S. Pat. No. 5,043,876, Charles R. Terry discloses an N-level file shadowing technique for use in a shared file environment. Terry maintains N-level shadow copies of each shared file to allow multiple users to read a consistent copy of the file even though other users may be simultaneously updating the same file. Every reader who opens the shared file sees the latest committed copy of the file and is unaware of updating transactions occurring after the file is opened. However, Terry permits only one updating transaction at a time, forcing other concurrent updating processes to wait because of update lock contention at the file or block level.

Although the locking contention and concurrency problem is keenly felt in the art, no teachings or suggestions are recorded for managing the concurrent accession of common data blocks containing multiple records in shared memory by record-level locking alone. That is, access by two or more concurrent updating transactions to the same block or data Control Interval (CI) normally requires locks at the data CI level, as taught by Terry and others. There is a strongly-felt need in the art for a method permitting concurrent access to a single block by two or more updating processes with serialization by record-level locking alone. The related unresolved problems and deficiencies are keenly felt in the art and are solved by the present invention in a manner described below.

3. Glossary of Acronyms

The following acronyms are used herein as defined below and may be appreciated with reference to the incorporated reference, this detailed specification and to any suitable IBM system manual, for example, "MVS/ESA VSAM Administration Guide" SC26-4518 International Business Machines, Inc., Armonk, N.Y., and Marilyn Bohl, "Introduction to IBM Direct Access Storage Devices" Science Research Associated, Inc., Palo Alto, Calif. (1981):

API Application Programming Interface
BMF Buffer Management Facility
CA Control Area
CI Control Interval
CI/CA Control Interval/Control Area
CIDF CI Definition Field
KSDS Key-Sequenced Data Set
PB Private Buffer
RLS Record Level Sharing
RMR Record Merge Redo
RPL Request Parameter List
SDSH Shared Data Storage Hierarchy
SES Structured External Storage
SLC Shared Local Cache
TLCE Test Local Cache Entry
UOW Unit Of Work

SUMMARY OF THE INVENTION

The methods of this invention permit a Virtual Storage Access Method (VSAM) to maintain record-level shared data integrity in a distributed multiprocessor environment without the overhead of block or data Control Interval (CI) level locking. Two or more processes may concurrently update different records in the same CI, using only a record-level lock. This invention includes methods for multiple Private Buffer (PB) data CI copies, a Shared Local Cache (SLC) invalidation protocol and a conditional write function.

In operation, the VSAM Record Level Sharing (RLS) methods of this invention permit a first process or Unit Of Work (UOW) to fetch a Private Buffer (PB) copy of a data CI containing the record of interest from shared Structured External Storage (SES) to a PB in Shared Local Cache (SLC). After the fetch, the first UOW logs all updates to the record of interest and conditionally writes the changed data CI back to SES. The SES write is conditioned upon there not having been an interim write to the same data CI by a second UOW. If a second UOW has indeed written the same data CI in the interim, the first UOW recycles by referring to SES for the most recent copy of the data CI, combining it with the logged updates from the first UOW and again conditionally writing the updated data CI back to SES.

Thus, the RLS methods of this invention do not require Shared Local Cache (SLC) buffer or data CI level locking for serialization of changes to shared data sets nor for SLC consistency. Instead, the novel protocols of this invention for testing cache entry validity and for conditionally writing to cache are used to detect data CI level contention.

It is an object of this invention to preserve updating process serialization by record-level locking alone. This objective is met by the Private Buffer (PB) copy, the SLC buffer invalidation and the conditional SES write methods of this invention.

It is an advantage of these methods that they avoid the overhead of locking and unlocking data CIs, which is a significant overhead cost in multi-system data sharing environments. It is another advantage of this invention that the new protocols reduce data sharing lock contention for multiple updating transactions accessing different records within the same data CI.

It is yet another advantage that UOWs may read unmodified records from a data CI that contains records concurrently accessed by updating transactions without waiting for the updating transactions to commit. That is, record-level read/write operations do not encounter data CI (block) level contention.

Perhaps the methods of this invention can be appreciated as a hybrid locking and versioning technique. Each Private Buffer copy in Shared Local Cache represents a consistent but perhaps outdated data CI version accessible only by the Unit Of Work for which it was created. Record-level locking is employed.

The absence of CI level locking permits data CI copies to exist concurrently in more than one Shared Local Cache. Each of these SLC copies may be updated concurrently, and the "validity" of each SLC copy is monitored at the SES level. Record-level locking is performed, so any concurrent updates within the same data CI must be against different records. Where concurrent updates are made to different copies of the same data CI, the multiple SLC copies are then merged according to the Record Merge Redo (RMR) method of this invention to form a new data CI copy in SES containing all updated records from the several concurrent transactions.

The Unit Of Work (UOW) is a new parameter of this invention that must be specified on the VSAM Request Parameter List (RPL). VSAM maintains an internal structure to track all activity on behalf of a single UOW. Included in the UOW structure is a pointer to a Private Buffer in SLC containing the associated PB copy of the data CI and a UOW log block listing the associated data CI change log for the UOW.

Only a single PB is maintained per UOW per data set. When the UOW accesses a second data CI, the first data CI is released either by an unconditional release if unchanged or by the conditional write method of this invention. The conditional write request results in a cycle of testing, invalidation, merging and reattempted conditional write until a new (updated and merged) data CI is successfully written to SES.

A special data CI level locking method is used to overcome the problems presented by VSAM data Control Interval and data Control Area splitting (CI/CA splitting) procedures that occur in response to occassional exhaustion of existing space within a data Control Interval or Control Area. These splitting procedures can be appreciated with reference to the VSAM Administration Guide or the Bohl references cited above.

The foregoing, together with other features and advantages of this invention, will become more apparent when referring to the following specifications, claims and the accompanying drawings.

BRIEF DESCRIPTION OF THE DRAWINGS

For a more complete understanding of this invention, reference is now made to the following detailed description of the embodiments illustrated in the accompanying drawings, wherein:

FIGS. 6A–6B show the effects of the data CI movements and index updates performed during a Control Area (CA) split operation; and FIGS. 7A–7D show the SLC evolution during an exemplary RMR operation conducted during a CI split operation.

DESCRIPTION OF THE PREFERRED EMBODIMENTS

The Virtual Storage Access Method (VSAM):

The methods of this invention are discussed in terms of the VSAM protocol used by IBM Corporation. VSAM is a facility for managing space in a hierarchical storage facility in a manner well-known in the art and is used herein to illustrate the operation of the methods of this invention. The references cited above provide all VSAM details necessary to appreciate the VSAM application of this invention. This invention is not limited to VSAM applications and relates to any similar distributed concurrent transaction processing systems, as should be clear to practitioners skilled in the art.

Figure 1A:
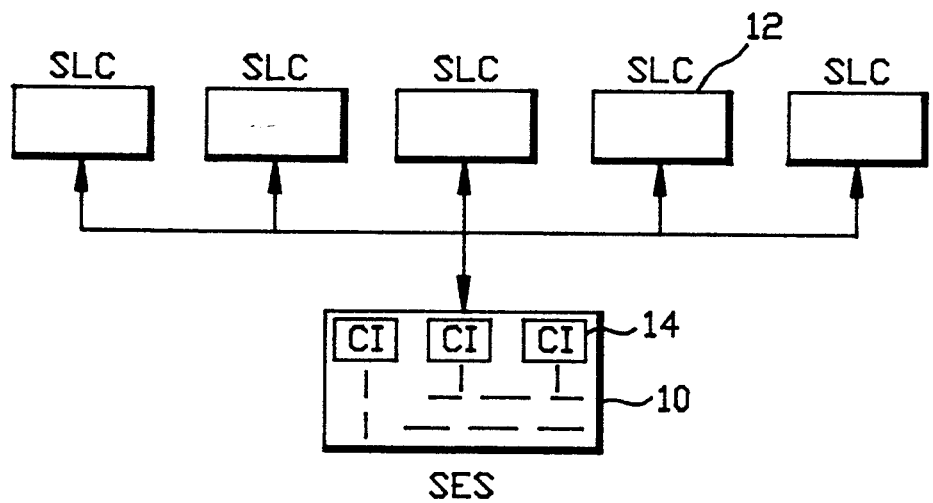
FIGS. 1A–1B show the Shared Local Cache (SLC) and Structured External Storage (SES) organization of the data CI and VSAM UOW information.

FIG. 1A shows a portion of an exemplary multiprocessor storage hierarchy. A Structured External Storage (SES) facility 10 is shown coupled to a plurality of Shared Local Caches (SLCs) typified by SLC 12. Data stored in SES 10 is typically organized in data Control Intervals (CIs) of records, typified by CI 14 in FIG. 1A. Each data CI is a fixed-length area of secondary storage containing records of some particular type of data. Examples of such records include Key-Sequenced Data Set (KSDS) records that are ordered in key sequence within the storage. A plurality of data CIs are typically organized in fixed-length regions of secondary storage called data Control Areas (CAs) (not shown).

A data CI is a continuous region of secondary storage that VSAM uses for storing data records and the control information describing them. It is the typical unit of data transfer between one storage level and another in a storage hierarchy. Its size varies from one data set to another, but the size of each data CI is fixed within one data set, either by VSAM or by the user within limits acceptable to VSAM. VSAM chooses the size based on the type of secondary storage hardware in use, the size of user data records, and the smallest amount of virtual storage space that user application programs make available for I/O buffers. Thus, a data CI is a device-independent unit of data transfer and may generally either span or be spanned by other data storage measures such as tracks, blocks or records.

In some instances, an insertion or a lengthening of a record will require more free space than is available within the corresponding data CI, leading to a "Control Interval split" operation wherein VSAM moves some of the stored records in the data CI to an unused data CI in the same CA. This frees some space to hold the new or updated records.

If no free data CI exists in the CA, an insertion requiring a free data CI leads to a "Control Area split" wherein VSAM establishes a new Control Area, either by using space already allocated or by extending the data set if the initially allocated space is full and extensions are provided for in the data set definition. VSAM then moves the contents of about half of the data CIs in the full CA to the free data CIs in a new CA. It then completes the triggering insertion operation by inserting the new records into the one of the two CAs dictated by the record key. Since about half of the data CIs in each of these CAs are now free, subsequent insertions should not require additional CA splitting. CI/CA splitting is not a common occurrence for data sets with sufficient distributed free space and occurs automatically under VSAM control.

Figure 1B:
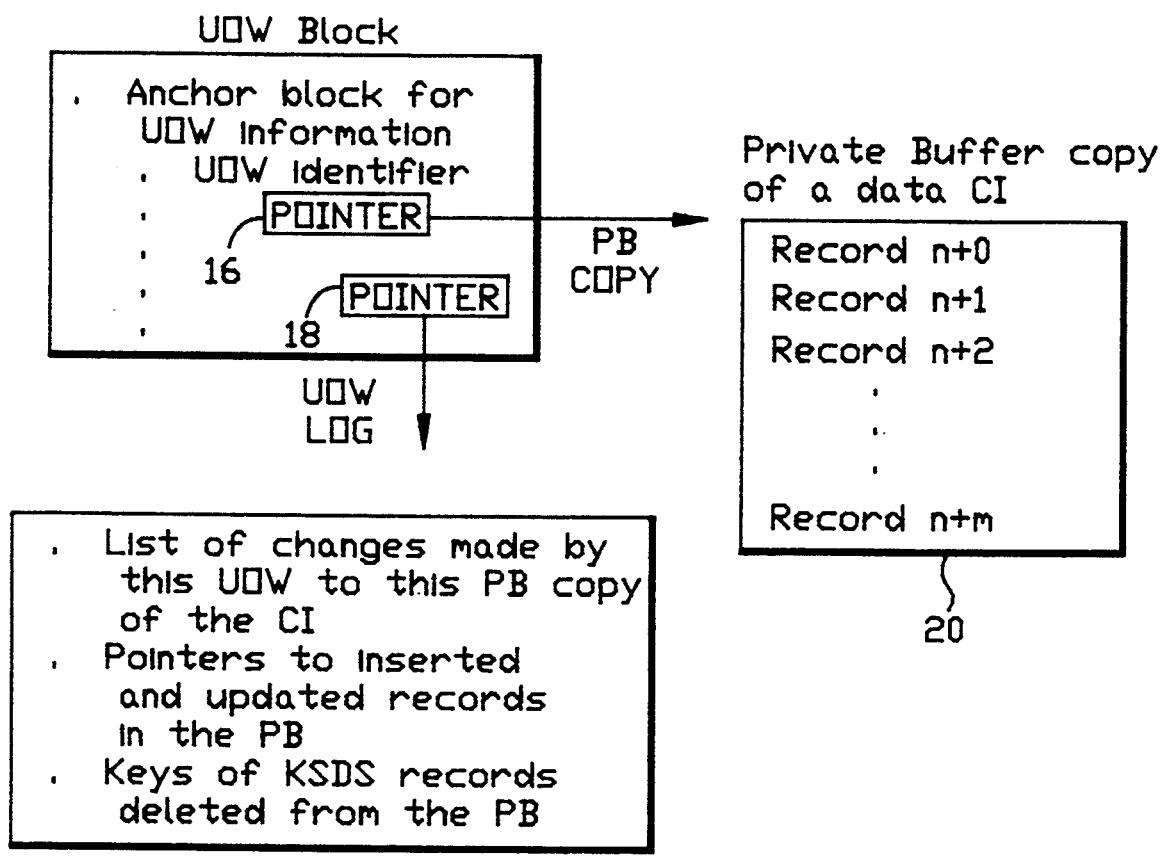

The VSAM Record Level Sharing ( RLS ) Invention:

The Record Level Sharing (RLS) methods of this invention extend the VSAM Application Programming Interface (API) to include support for application Units Of Work (UOWs). UOW is a new parameter specified by way of the VSAM Request Parameter List (RPL). VSAM maintains an internal structure through which it tracks its activity on behalf of a UOW. Referring to FIG. 1B, the UOW block structure includes a pointer 16 to a copy of a data CI in a Private Buffer (PB) obtained from the VSAM Buffer Management Facility (BMF) and a pointer 18 to the UOW log containing information about any record modifications made to the Private Buffer (PB) copy 20 by PUT/ERASE requests that specify the UOW in their RPLs.

VSAM maintains information about no more than one BMF buffer per UOW per data set. In general, VSAM maintains the Private Buffer for the UOW until the UOW requests a reference to a different data CI within the data set. VSAM then issues a RELEASE NOWRITE request to BMF to release an unmodified buffer and a RELEASE WRITE request to write and release a modified buffer.

Figure 2:
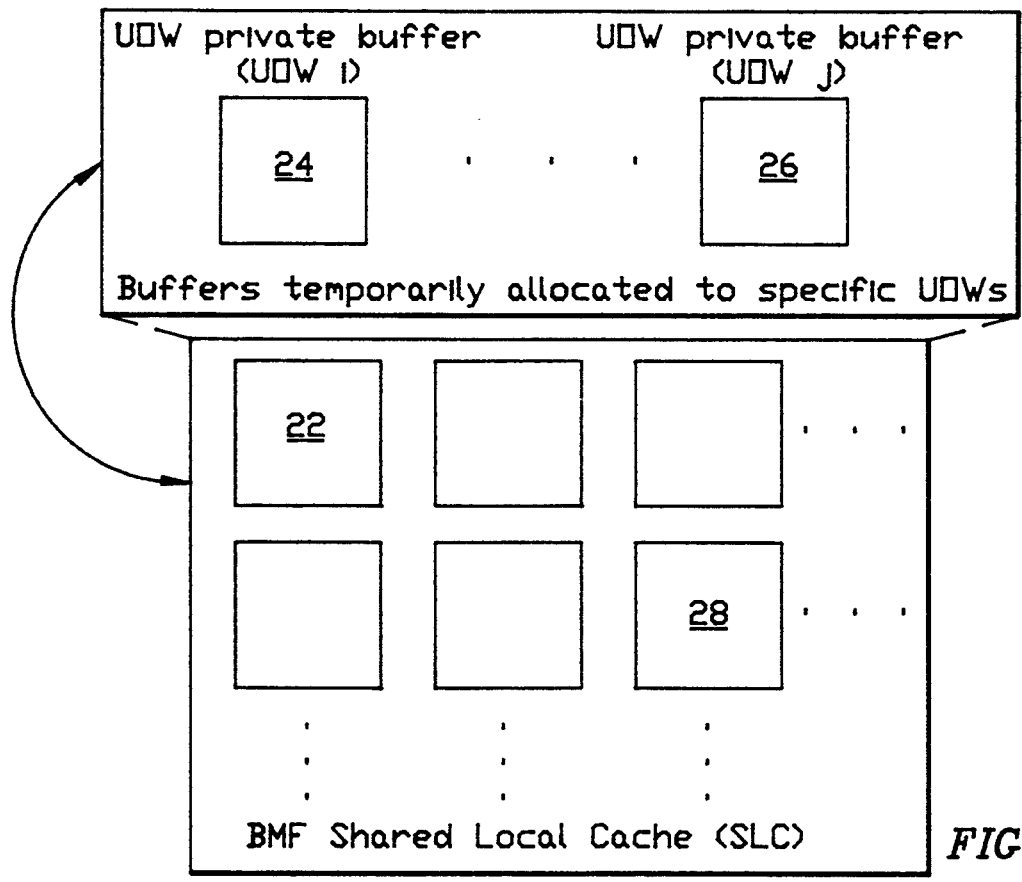
FIG. 2 shows the SLC buffer organization required for the VSAM Record Level Sharing (RLS) invention.

FIG. 2 illustrates the relationship between the UOW Private Buffers and the SLC typified by SLC 12 in FIG. 1A. The BMF manages all of the buffers. The SLC is a storage level in the Shared Data Storage Hierarchy (SDSH) illustrated in FIG. 1A. Within the SLC in FIG. 2, a number of data CI copies, exemplified by data CI 22, are stored, having been written from SES 10 on FIG. 1A. SES may write other copies to other SLCs but must monitor the "validity" of all such local CI copies. The UOW Private Buffers may also be contained in SLC and are used to hold record updates made by single UOWs as illustrated in FIG. 1B.

FIG. 2 shows that the local copy of data CI 22 can be written into a UOW Private Buffer as many times as necessary, depending on the number of UOWs that concurrently access the local copy of data CI 22. The UOW Private Buffer is exemplified in FIG. 2 by PB 24. PB 26 in FIG. 2 could be a second copy of data CI 22 for UOW j, where PB 24 is a first copy for UOW i.

In FIG. 2, after UOW i requests access to a second data CI 28, the VSAM issues one of two available RELEASE instructions for PB 24. The RELEASE NOWRITE is an unconditional release of an unmodified PB. The RELEASE WRITE (discussed below) is a conditional write request that fails when PB 24 or data CI 22 has been invalidated by a RELEASE WRITE issued to another copy of the same data CI on behalf of another sharing UOW, either locally or in another SLC. This happens when two or more UOWs obtain copies (through LOCATE UPDATE commands) of the same data CI, modify the buffers, and then attempt to write (through the RELEASE WRITE command) the modified Private Buffers. The first RELEASE WRITE is successful. The others fail. The failing writes caused VSAM to perform the Record Merge Redo (RMR) processing described below.

The Record Level Sharing Functions (RLS):

VSAM uses the following new functions to obtain cached access to data CIs of record-level shared VSAM data sets.

(a) LOCATE READ Function: This function opens UOW access to a shared buffer in SLC, exemplified by data CI 22 in FIG. 2. If the requested data CI is not available in the local SLC, VSAM causes a local copy to be written from SES 10 in FIG. 1A. Multiple local UOWs may share (read) shared buffer 22.

(b) LOCATE UPDATE Function: This function opens UOW access to a Private (non-shared) Buffer copy of a data CI, such as PB 24 in FIG. 2. This function also creates a consistency or "update version" token and writes it to the PB content. The PB copy of the data CI is created in response to a request for access by an updating UOW and is abolished (released) in response to a request for access to another data CI by the same UOW.

(c) RELEASE NOWRITE Function: This function removes a calling UOW's access to a PB copy of a data CI. This function is invalid for any PB copies that have been updated or changed. The subject PB copy is abolished or released.

(d) RELEASE WRITE Function: This is the conditional write function that writes the PB contents to the data CI SLC buffer and to the central SES cache. The first step is to check the PB consistency token for validity and to return a conditional write failure message if the token is invalid. If the token is valid, the next step is to write the PB content to the SLC buffer (e.g. buffer 22 in FIG. 2) and to request permission from SES cache to write the PB content to SES. If SES has invalidated the SLC buffer copy of this data CI (through the SES CROSS-INVALIDATE subfunction of an earlier RELEASE WRITE operation), the next step returns a conditional write failure message. If the SES cache accepts the PB contents, this function first generates and writes a new consistency token to the PB that invalidates all previous consistency tokens and then writes the new consistency token to the SLC shared-buffer. Finally, the updated SLC buffer is then written to SES, which then invalidates all other SLC copies of the data CI with the SES CROSS-INVALIDATE subfunction. Upon successful transfer of PB contents to both SES and SLC, the UOW access to this PB is removed, abolishing the PB.

(e) TEST BUFFER VALIDITY Function: This function checks the local consistency token in SLC buffer and issues a MVS Test Local Cache Entry (TLCE) Validity command, which checks SES to ensure that a SES CROSS-INVALIDATE operation has not yet occurred.

(f) SES CROSS-INVALIDATE Function: This is a SES cache subfunction of the RELEASE WRITE function and is the basis for SLC consistency in the multi-system environment. The SES registers and monitors the contents of a set of connected SLCs as shown in FIG. 1A. When a SLC entry is written to SES, the SES invalidates any existing copies of the named data CI in other SLCs, causing any subsequent conditional writes to SES of the invalidated SLC entries to fail. This conditional write capability of the SES cache is the means for determining write contention across the SLC boundaries on a VSAM data CI. Failure of the conditional write triggers the VSAM RMR process.

(g) Test Local Cache Entry (TLCE) Validity Function: This is a standard function provided by the DFP BMF and the SES cache. The VSAM RLS methods of this invention use the BMF TLCE function in instances where a VSAM record must first be located before locking. Such instances include those where application requests do not specify the complete record identifier. Examples are GET sequential, GET key greater than or equal, and GET generic key search. For such requests, VSAM uses BMF to obtain access to SLC buffers containing data CIs. The CIs are searched to locate the requested record. Having located the record, VSAM knows the complete record identifier (the key for KSDS or the RIN for key-less types). A record lock is then granted using the record identifier as the lock name. Before returning the locked record to the application, VSAM must ensure that the SLC copy of the record is the most current version of the record as determined by the central data in SES cache. VSAM uses the BMF TLCE Validity function to verify that the accessed data CI has not been changed by some other UOW in some SLC. The combination of the two requirements for SLC buffer validity and for exclusive record lock ensures that the most current version of the record is being returned to the application. If the SLC buffer copy is not valid or if the record is not found locally, VSAM calls BMF to obtain a new buffer copy in SLC of a SES version of the data CI. Also, for a KSDS record, a CI/CA split operation may have moved the desired record to a new data CI. In such a case, VSAM searches the KSDS index to locate the new data CI actually required.

(h) Record-Level Locking Function: The VSAM RLS methods of this invention do not use SLC buffer entry (data CI) level locking. Instead, the TLCE Validity and the RELEASE WRITE functions are used to detect SLC buffer entry level contention. This approach avoids the SLC buffer locking overhead, giving significant savings for distributed data sharing systems. This approach also reduces lock contention because multiple transactions may update different records within the same data CI without waiting for one another. Also, unmodified records can be read from copies of a data CI that contains records modified by other UOWs without waiting for commit. Thus, record operations do not encounter SLC buffer level contention. The absence of data CI level locking permits the situation described above where copies of a data CI may reside concurrently in more than one SLC. Each of these SLC copies may be concurrently updated. Record locking is performed so that any concurrent updates are always made against different records within the data CI. Such concurrent updates leads to a requirement for the RMR function.

(i) Record Merge Redo (PAR) Function: This function merges the changed records in the multiple data CI copies from the various SLCs to form a single data CI copy containing all of the changed records. This can best be appreciated through the following example.

Figure 3:
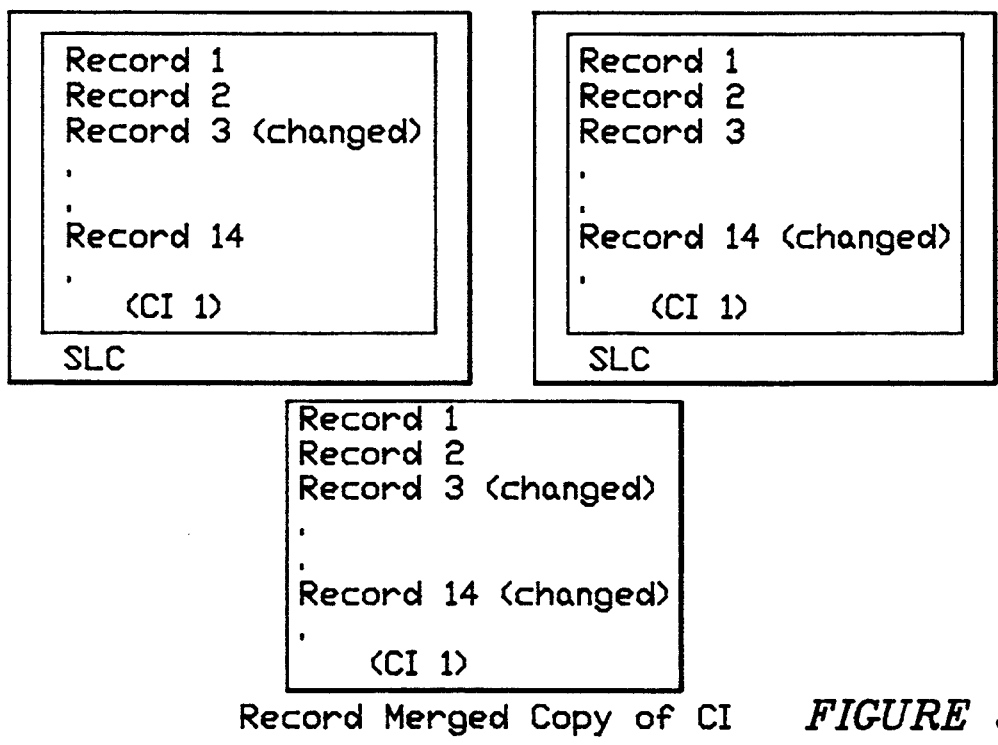
FIG. 3 illustrates the Record Merge Redo (RMR) method of this invention applied to two SLC Private Buffer (PB) copies of a data Control Interval (CI)

Referring to FIG. 3, a data CI copy in SLC 1 is shown having Record 3 changed. Another copy of data CI 1 in SLC 2 is shown having Record 14 changed. The LOCATE UPDATE function can generate such multiple PB copies of the same data CI within the environment of a single SLC. Thus, whether two such PB copies of data CI 1 exists in the same SLC or in different SLCs, this function permits merger of these two PB copies to form the single Record Merged Copy of CI 1 shown in FIG. 3.

Figure 4A:
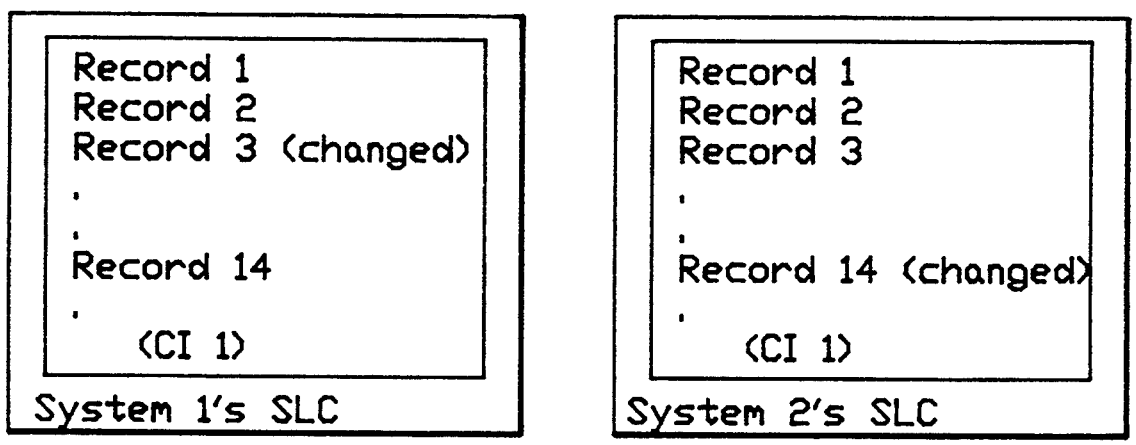
FIGS. 4A–4D show the evolution of SLC contents during an RMR example.

FIGS. 4A-4D show the SLC and SES copies of a data CI during a RMR operation. In this example, System 1 and System 2 both update records within the same data CI 1. Each system first reads a copy of CI 1 into its SLC and updates a record in the SLC copies of CI 1. The results of these operations are shown in FIG. 4A.

Figure 4B:
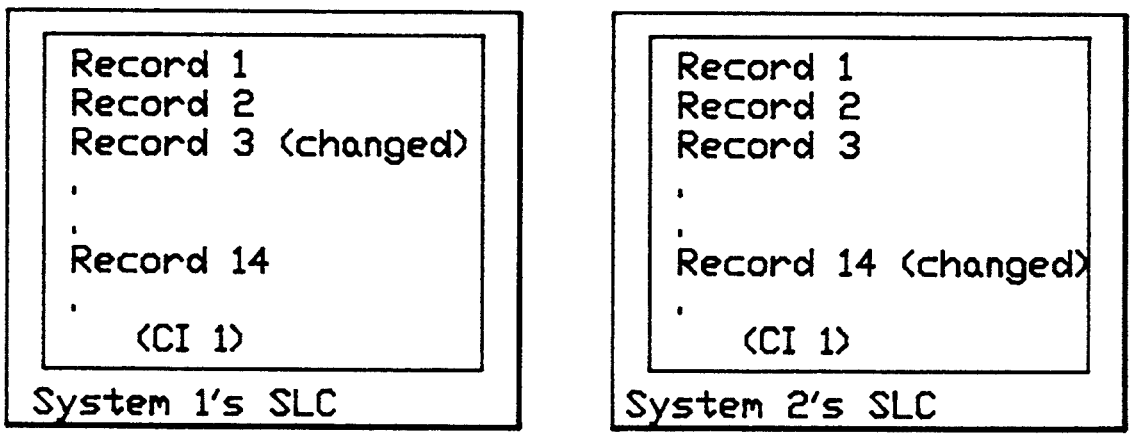
Figure 4B:
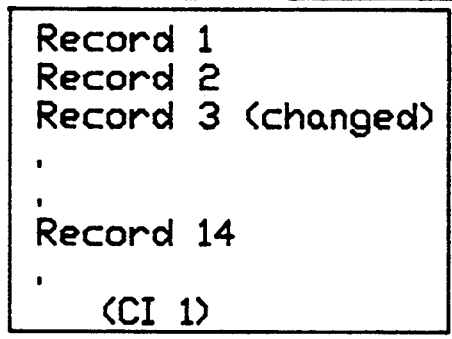

System 1 next issues a RELEASE WRITE (conditional write) command for its copy of CI 1. The RELEASE WRITE is successful and invalidates all other SLC copies of CI 1 including the SLC entry in System 2. The results of these two operations are shown in FIG. 4B.

Figure 4C:
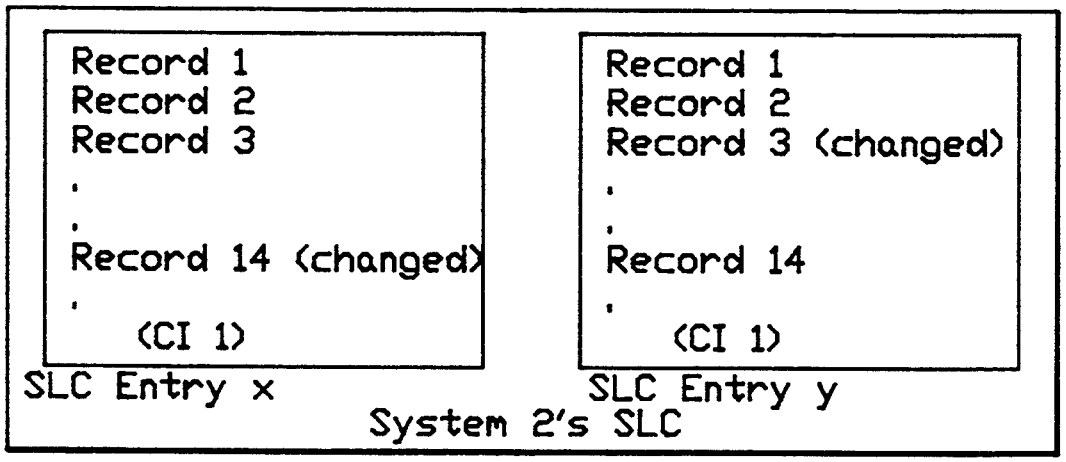

When System 2 issues a RELEASE WRITE command for its copy of CI 1, the conditional write fails because the System 2 SLC entry was invalidated by the earlier successful RELEASE WRITE of the System 1 copy. Upon notification of the failure of its RELEASE WRITE command, System 2 then issues a SES read command to obtain a valid copy of CI 1. After receipt of the valid copy, System 2 now has two different copies of CI 1, as illustrated in FIG. 4C.

Figure 4D:
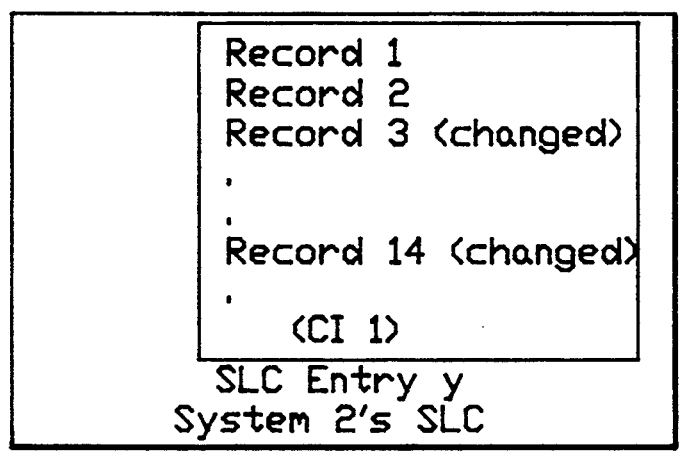
Figure 4D:
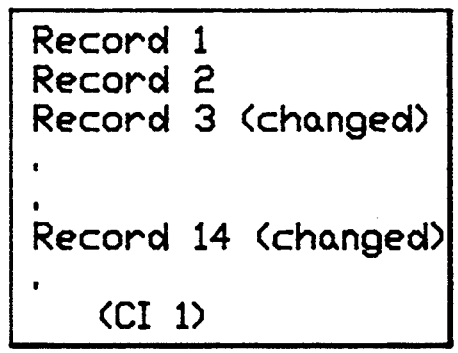

VSAM then reapplies the changes to Record 14 imposed by the System 1 UOW to the valid copy of CI 1 obtained from SES. System 2 reissues the RELEASE WRITE for the newly updated valid copy of CI 1 and this write is successful. The RMR operation is now complete and the results are as shown in FIG. 4D. Because of the latest successful SES write by System 2, the SLC copy of CI 1 in System 1 shown in FIG. 4B is now invalid.

The CI/CA Split Problem:

The several RLS functions described above must be modified slightly to adapt to the problems presented by the VSAM CI/CA split function. The methods of this invention use a global data set level exclusive lock to serialize CI/CA splits and the related index updates for a data set. The index and data changes made by a CI/CA split are written to the SLC and SES caches immediately. The changes are not buffered in UOW Private Buffers.

Although CI/CA splits are serialized for a data set, they are not serialized with respect to the Get/Put/Erase requests that do not cause CI/CA splits. The record-level lock of this invention does not inhibit a CI/CA split of the CI/CA containing the locked record. Also, the existence of PB copies of a modified CI do not inhibit another UOW from splitting the same data CI or splitting the CA containing the same data CI. Thus, some coordination and serialization across CI/CA splits and the concurrent access and deferred write of CIs involved in the split is required.

The movement of existing records from one CI to another during a VSAM CI/CA split demands some extension to the VSAM RLS serialization methods of this invention. Since the RLS record lock name is based on the record key, movement of a record from one CI to another does not affect the record lock, and the record lock properly serializes access to the record before, during and after the CI/CA split. However, the SES CROSS-INVALIDATE function of this invention is not in itself sufficient to maintain data CI integrity when the CI/CA split operation moves records to new CIs. The following example illustrates a typical problem with serialization during CI/CA splits.

Figure 5A:
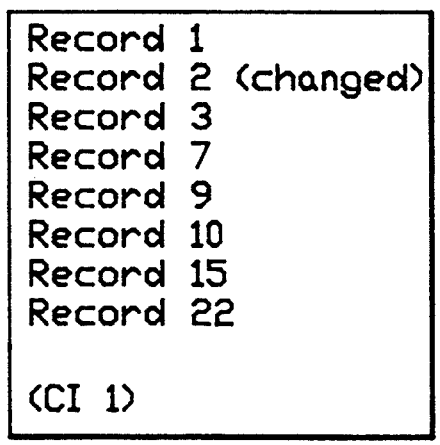
FIGS. 5A–5B show the evolution of SLC contents for a KSDS CI/CA split and index update example.
Figure 5A:
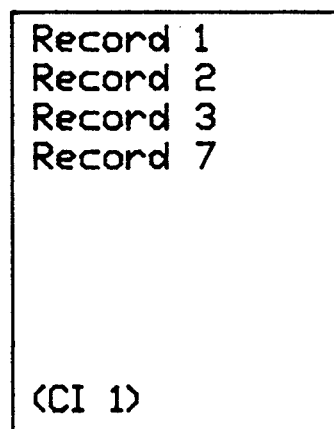
Figure 5A:
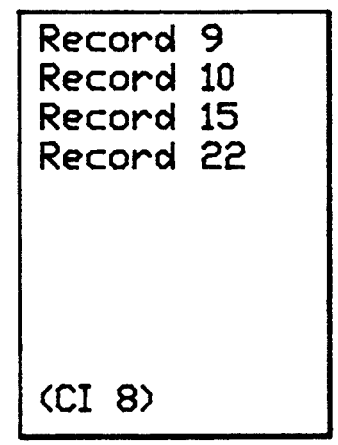
Figure 5A:
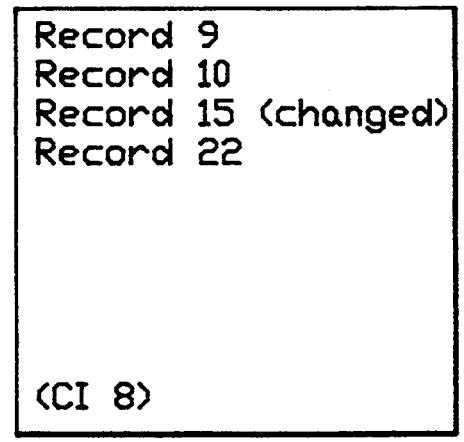

FIG. 5A illustrates data CI 1 in a UOW 1 PB. UOW 1 has changed Record 2 in its copy of data CI 1. It has not written its copy of CI 1 to either SLC or SES.

UOW 2 next causes a split to CI 1 by some operation that exceeds available CI 1 space. The CI split uses two SLC buffers and forms CI 1 and CI 8 as shown in FIG. 5A. The UOW 2 copy of CI 1 does not contain the UOW 1 changes to Record 2.

The CI split data movement and index update steps for UOW 2 are: (a) create and write CI 8; (b) update the index to change the key for CI 1 and add an entry for CI 8; and (c) write a new CI 1 removing the records that were moved to CI 8.

Now suppose that, between the index update and new CI 1 write steps of the UOW 2 CI split, a third UOW searches the index, locates CI 8, modifies Record 15 and writes an updated CI 8. The resulting buffer situation for all three UOWs is shown in FIG. 5A.

Now, UOW 1 writes its PB copy of CI 1. UOW 2 has not yet written its PB copy of CI 1. Hence, the UOW 1 PB copy is still valid and the UOW 1 RELEASE WRITE to SLC and SES (not shown) is successful. This write invalidates (by an SES CROSS-INVALIDATE) the UOW 2 PB copy of CI 1. When UOW 2 now attempts to write CI 1, the conditional write fails.

The situation created in this example and illustrated in FIG. 5A is far more complex than the RMR example discussed above in connection with FIGS. 4A–4D. UOW 2 cannot access the log of record changes made by UOW 1 to CI 1 because the log originally linked to UOW 1 was deleted upon the successful RELEASE WRITE of UOW 1. Also, the logged record changes to CI 8 by UOW 3 must be somehow saved.

Figure 5B:
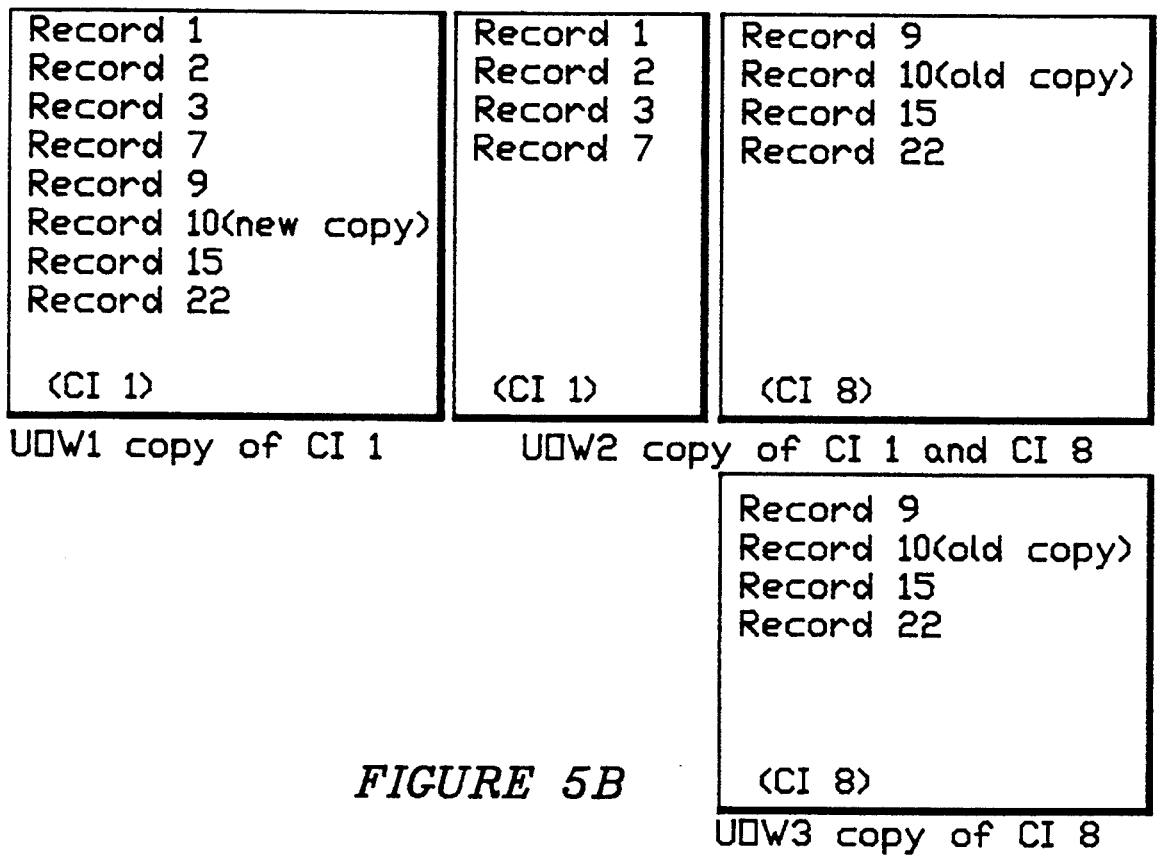

FIG. 5B illustrates another problem that the methods of this invention must accommodate. This is a variation on the example discussed above in connection with FIG. 5A. UOW 1 holds a PB copy of CI 1 in which it has changed Record 10. The UOW 1PB copy has not been written to SLC or SES.

UOW 2 then causes a split to CI 1 in some fashion. During this split, UOW 1 successfully RELEASE WRITES its PB copy of CI 1 and releases its lock on Record 10. The split has already moved the old version of Record 10 to the new CI 8 and has updated the KSDS index showing the new key location.

UOW 3 then obtains a lock on Record 10 and locates (by way of new KSDS index) the old version of Record 10 held in the new CI 8. This action violates the basic record accession integrity of the Record Level Sharing method of this invention and must be prevented.

This invention uses a preferred serialization technique to coordinate record/CI accession with CI/CA split processing rather than incorporating an alternative complex RMR procedure to handle all of the various situations that might occur. These preferred CI/CA split serialization techniques are now described below.

Serialization Between Record/CI Access and CI Split:

The CI split process begins by setting a bit (CIDF-BUSY) in the Control Interval Definition Field (CIDF) and then writing the CI. This announces to all accessing processes that the CI split is in progress. Should a system fail before the CI split is complete, all future accesses to the CI note the set CIDFBUSY bit and invoke the necessary recovery processing to clean up or to complete the split. The last step in a CI split is to rewrite the CI that was split absent the records that were moved and with the CIDFBUSY bit disabled.

For the RLS method of this invention, the RELEASE WRITE function that normally is used to set the CIDFBUSY bit may fail because of SLC invalidation. The CI split process must then ask BMF for a valid copy of the CI and must repeatedly attempt to set the CIDFBUSY bit until the bit stays set.

The RLS method of this invention permits a CI split to finish once it has set the CIDFBUSY bit without interference from other UOWs attempting to write the CI to SLC or SES. The successful write that sets CIDFBUSY in the splitting CI triggers an SES CROSS-INVALIDATE operation that invalidates any other existing UOW PB copies of that CI. If a UOW modifies (or has already modified) its PB copy of the data CI and then attempts to write the invalidated PB, the conditional write will fail. The UOW then obtains a valid copy of the CI from BMF and finds the CIDFBUSY bit set. In response to this set bit, the UOW is obliged to request the "CI split lock". This split lock operates to serialize the UOW with the CI split process and is the preferred method for doing so.

Thus, when a UOW reads a CI and sees a set CIDF-BUSY bit, it immediately requests the CI split lock. This UOW waits for the completion of the CI split process and release of the CI split lock.

The situation where a UOW has a PB copy of a data CI when activity by another UOW splits the data CI can be summarized as follows.

(a) If the UOW PB copy of the CI was obtained during the CI split, it contains the CIDFBUSY bit set. This set bit causes the UOW processing to release the PB and to request the CI split lock.

(b) If the UOW PB copy was obtained before the CI split, the CI split step of setting the CIDFBUSY bit has already operated (by SES CROSS-INVALI-DATE) to invalidate the UOW PB copy. Subsequent processing of requests for that UOW will detect the invalid PB copy as follows:

(1) Sequential Processing: After obtaining a lock on the record and before returning the record to the application, VSAM issues a TEST BUFFER VALIDITY request to BMF. The request fails.

(2) PUT-for-Update Or ERASE Functions: The subject record was located and locked by a previous GET-for-Update request. Thus, the record may be changed in the PB holding the invalid data CI. Later, when VSAM attempts to write the invalid PB copy, the BMF RELEASE WRITE functions fails on PB copy invalidity.

(3) Direct or Skip Sequential Request: Before attempting to locate the requested record, VSAM releases the UOW PB. If the PB was modified, a BMF RELEASE WRITE is issued. The request fails because of SES invalidation.

Whenever a TEST BUFFER VALIDITY function fails and the PB was modified and whenever a RELEASE WRITE function fails, VSAM performs a RMR function to reapply the record modifications to the data set. Thus, the combination of PB invalidation, the actions taken when the CIDFBUSY bit is set and the CI split lock together provide serialization between CI split operations and concurrent record updates to the same data CI. This preferred method avoids the two problems discussed above in connection with FIGS. 5A-5B as follows.

In the example illustrated in FIG. 5A, UOW 1 wrote CI 1 after UOW 2 split CI 1. In the interim, UOW 3 changed and wrote the new CI 8 created by this CI split. When UOW 2 tried to write CI 1, the write failed because the UOW 1 write had invalidated the UOW 2 PB copy. UOW 2 was not able to recover from this situation because it cannot determine which records were changed by UOW 1 and UOW 3. Moreover, the record locks may have already been released by UOW 1 and/or UOW 3.

This problem is solved by the above CIDFBUSY based serialization procedures. The CI split process for UOW 2 sets the CIDFBUSY bit and writes CI 1, invalidating the UOW 1 PB copy, before performing the data movement steps. This inhibits UOW 1 from writing back its copy of CI 1 until the CI split completes because, if UOW 1 attempts the write before the CI split completes, the write fails for UOW 1 PB invalidity. UOW 1 then begins a RMR procedure to revalidate its PB copy and, if UOW 1 rereads CI 1 before the CI split is complete, the CIDFBUSY bit is found to be set and UOW 1 requests and waits for release of the CI split lock in the manner discussed above.

In the example shown in FIG. 5B, the CIDFBUSY based serialization procedure keeps UOW 1 from writing the updated version of Record 10 and UOW 1 thus retains the record-level lock on Record 10 until the CI split completes. UOW 3 waits on the record lock until UOW 1 completes the update, which in turn waits for the CI split to complete. Record access integrity is thereby maintained.

Figure 6A:
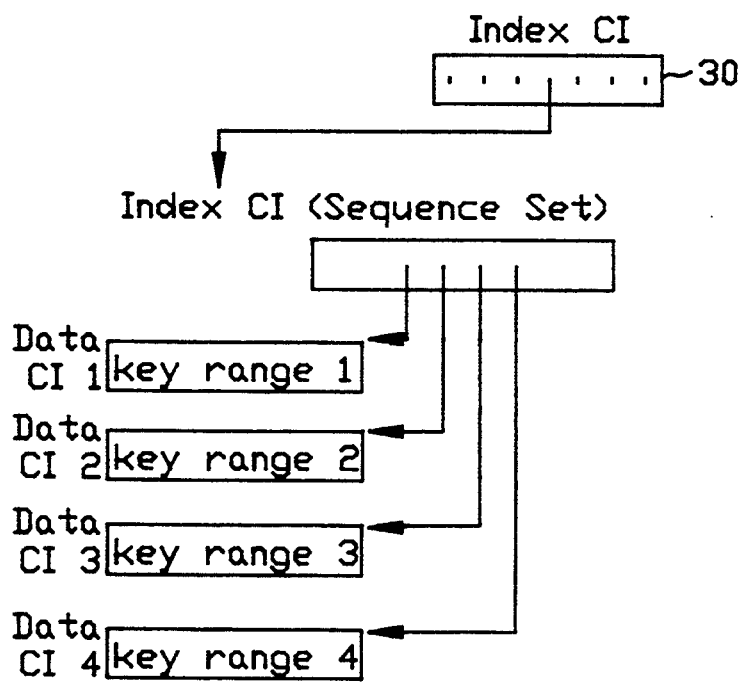

Serialization Between Record/CI Access and CA Split:

FIGS. 6A-6B illustrates the CI data movements and index updates performed by a CA split operation. FIG. 6A shows the CA as it appears before the CA split operation. The CA includes four CIs.

In FIG. 6B, the CA split operation moves the contents of CI 3 to CI 5 and the contents of CI 4 to CI 6. The split updates the KSDS index 30 to reflect the new CA and the data movement. CI 3 and CI 4 are rewritten as free space (empty) CIs. The two CAs resulting from the CA split operation are shown in FIG. 6B.

CA split data movement done concurrently with record updates by other UOWs to CIs in the CA can create complex RMR requirements similar to those illustrated in the CI split examples. Thus, the inventors choose to serialize the writing of modified CIs with the CA movement of those CIs. The following serialization methods were considered.

(1) Buffer Invalidation: This approach obtains and holds a buffer for each CI that is being moved by the CA split operation to a new CA. This permits the CA split to detect an update to a CI that was moved. An attempt by the CA split to rewrite the moved CI with a free space CI then fails because of PB copy invalidation. Thus, the CA split operation must reread the CI and then rewrite it to its new location in the new CA. Unfortunately, another UOW may have modified and rewritten the CI during the interim when the CI was moved to the new CA. This is a similar situation to the one discussed above in connection with FIG. 5A. The CA split operation must merge the changes made by the other two UOWs and no log of these changes is available. Another problem with this approach is that the system that is performing the CA split may fail during the split operation. Such a failure would remove all invalidation indications from the CA split buffers. It is not clear how recovery from such a situation can be performed. The inventors abandoned this approach to CA split serialization.

(2) CI Level Locking During the CA Split Operation: This approach requires VSAM to inform BMF of the set of CIs that will be moved during the CA split operation. BMF must then either use cross-system signalling directly or use some new DFP lock manager function (not currently identified as a requirement and thus not defined) to inhibit access to all buffers containing the CIs that are to be moved by the CA split operations. When VSAM requests access to one of the CIs and receives such an "access-inhibited response", a request for the CI split lock is issued to ensure that all processing waits for completion of CA split operation. This technique seems to work but it requires cross-system signalling to start and stop the CI level serialization and the necessary logic is exceedingly complex.

(3) Set CIDFBUSY Bit in All CIs to be Moved: Prior to moving any CIs or updating the index, the CA split operation sets CIDFBUSY in each CI that will be moved. This approach has the advantage that it is the same serialization technique used for the CI split situation discussed above in connection with FIGS. 5A–5B. Thus, it is the preferred method for both CI split and CA split serialization.

RMR/CI Split Example:

FIGS. 7A–7D illustrates a RMR operation during a CI split operation. In the example shown in FIG. 7, UOW 1 has changed two records in its PB copy of data CI 1. Before UOW 1 writes its modified PB copy, UOW 2 splits this CI. The CI split leaves one of the records (old copy) modified by UOW 1 in the original CI 1 and moves the other one to the new CI 8. The UOW 1 RMR operation accesses and changes both CI 1 and CI 8.

In FIG. 7A, UOW 1 has changed Record 3 and Record 15 in CI 1. UOW 1 has not yet written the modified PB copy of CI 1.

In FIG. 7B, UOW 2 splits CI 1 as follows. Because UOW 1 has not yet written the modified PB copy of CI 1, the CIs written by UOW 1 contain copies of Record 3 and Record 15 as they were before modification by UOW 1. The CI split operation successfully writes CI 1 and CI 8 and then updates the KSDS index.

Following completion of CI split, UOW 1 attempts to write CI 1. Because the UOW 1 PB copy of CI 1 was invalidated by the CI 1 write made by the CI split, UOW 1 begins the RMR. The RMR operation obtains a valid copy of CI 1 and reapplies the logged updates by UOW 1 for Record 3, as shown in FIG. 7C.

The RMR operation detects the change in key range of CI 1 and notes that this key range no longer includes Record 15. The valid PB copy of CI 1 is then written and released through the RELEASE WRITE function.

The KSDS index is next searched to locate Record 15 in CI 8 and the logged changes by UOW 1 to Record 15 are then applied to CI 8 as shown in FIG. 7D.

The PB copy of CI 8 shown in FIG. 7D is then written and released through the RELEASE WRITE function. The PB copy of the obsolete version of CI 1 is released through the RELEASE NOWRITE function. The RMR completes with the results shown in FIG. 7D.

Clearly other embodiments and modifications of this invention will occur readily to those of ordinary skill in the art in view of these teachings. Therefore, this invention is to be limited only by the following claims, which include all such embodiments and modifications when viewed in conjunction with the above specifications and accompanying drawings.

We claim:

1. In a concurrent transaction processing system where a plurality of asynchronous processes access records in a data set stored in a shared Structured External Storage (SES) means and organized as a plurality of SES data Control Intervals (CIs), said access being through said shared SES means, a method for updating a first record comprising the steps of:

(1) identifying the SES data CI containing said first record in response to an update access by a requesting process;

(2) creating a Private Buffer (PB) CI copy of the latest version of said SES data CI that is accessible only by said requesting process;

(3) updating said first record in said PB CI copy according to said requesting process to form an updated PB CI copy;

(4) conditionally writing said updated PB CI copy to said SES data CI if said latest version of said SES data CI has not yet been updated by another process, otherwise repeating steps (2)–(4); and (5) terminating access by said requesting process to said PB CI copy.

2. The method of claim 1 comprising the additional steps of:

(1.1) granting an exclusive record-level lock to said requesting process on said first record.

(2.2) adding a consistency token means for determining data validity to said PB CI copy.

3. The method of claim 2 wherein said conditional writing step (4) comprises the steps of:

(4.1) testing the validity of said consistency token means and repeating steps (2)–(4) until said token means is found to be valid;

(4.2) writing said updated PB CI copy to said SES data CI; and (4.3) revising said consistency token means in said updated PB CI copy to invalidate all earlier consistency token means.

4. The method of claim 3 comprising the additional step of:

(4.4) writing said PB CI copy to a Shared Local Cache (SLC), whereby all other PB copies of said SES data CI are invalidated.

5. The method of claim 4 comprising the additional steps of:

(1.2) setting a CI busy indicator means for announcing pending or actual movement in each said SES data CI that contains records that are subject to movement by a VSAM CI split process that splits one or more said SES data CIs into at least two new SES data CIs; and (1.3) granting an exclusive lock to said requesting process on said data set in response to access by said requesting process to an SES data CI having said CI busy indicator means set, whereby said requesting process is forced into VSAM CI split process.

6. The method of claim 2 comprising the additional steps of:

(1.2) setting a CI busy indicator means for announcing pending or actual movement, in each data CI that contains records that are subject to movement by a VSAM CI split process that splits one or more said SES data CIs into at least two new SES data CIs; and (1.3) granting an exclusive lock to said requesting process on said data set in response to access by said requesting process to an SES data CI having said CI busy indicator means set, 7. The method of claim 1 comprising the additional step of:

(4.1) writing said updated PB CI copy to a Shared Local Cache (SLC). whereby said requesting process is forced into concurrent consistency with said VSAM CI split process.

8. A method for record updating using solely record-level locking in a database system having a plurality of storage blocking intervals each including at least two records or the padded equivalent, said blocking intervals being accessed by a plurality of concurrent asynchronous processes through Shared External Storage (SES), said method comprising the steps of:

(a) ascertaining whether a first storage blocking interval containing a first record requested by a first process resides in said SES;

(b) fetching the most recent copy of said first storage blocking interval from the SES and storing as an exclusive storage blocking interval copy for exclusive access by said first process;

(c) changing said exclusive storage blocking interval copy by said first process to create a changed exclusive storage blocking interval copy and logging said changes;

(d) writing said changed exclusive storage blocking interval copy conditionally to SES, said changed exclusive storage blocking interval copy being accepted by SES if said first storage blocking interval was not otherwise changed in SES by another process during the time since the fetching of said first storage blocking interval copy for said first process; and (e) if said changed exclusive storage blocking interval copy is not accepted by SES, fetching from SES a more recent first storage blocking interval copy and repeating steps (c)–(d).

9. The method of claim 8 comprising the additional step of:

(a.1) granting to said first process an exclusive record-level lock on said first record.

* * * * *